March 24, 1925.  
F. GELSTHARP  
1,531,089
ORNAMENTAL GLASS AND PROCESS OF MAKING IT
Filed March 27, 1924
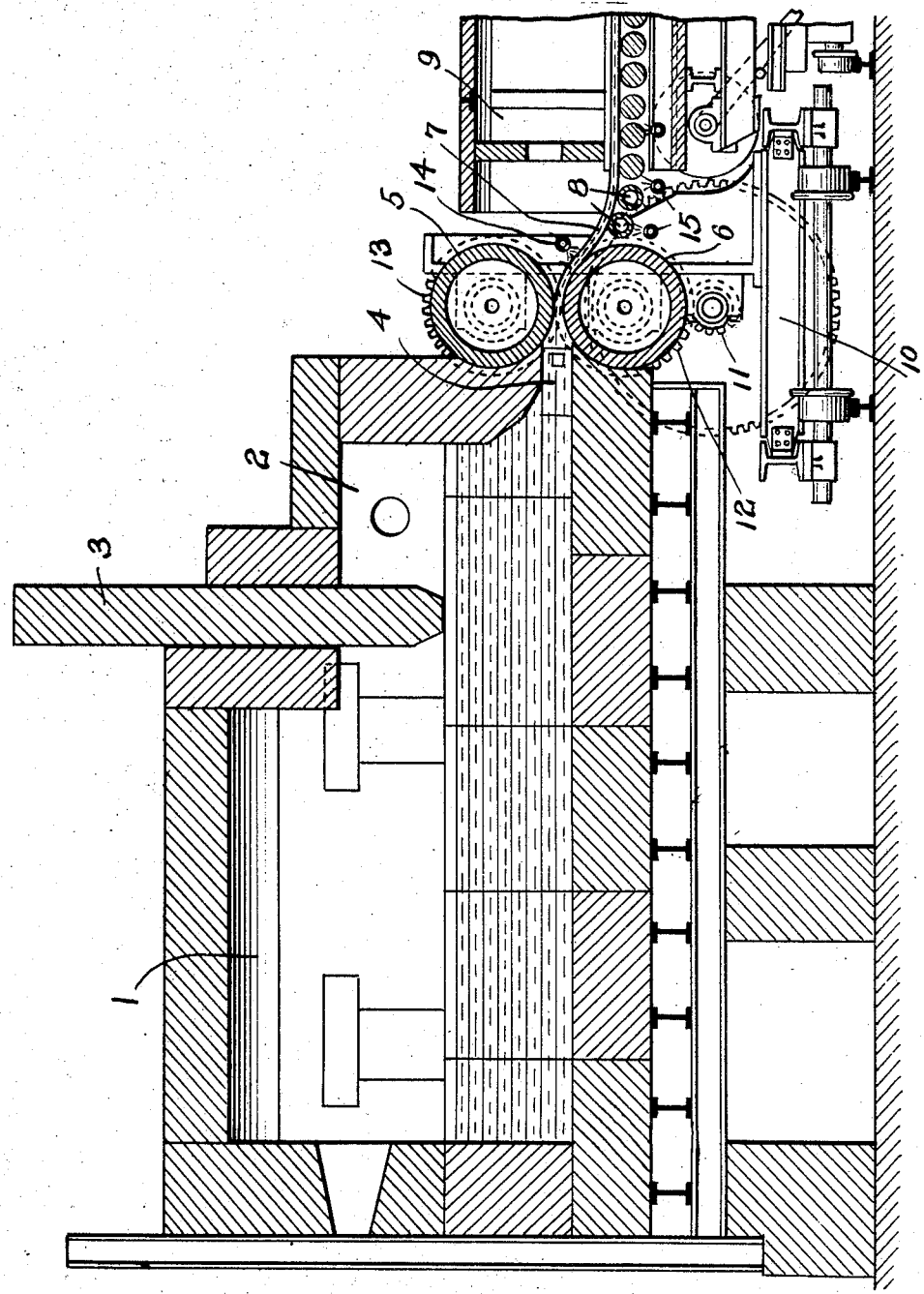
INVENTOR  
Frederick Gelstharp  
by  
James C. Bradley  
atty Patented Mar. 24, 1925.

1,531,089

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

ORNAMENTAL GLASS AND PROCESS OF MAKING IT.

Application filed March 27, 1924. Serial No. 702,290.

*To all whom it may concern:*

Be it known that I, FREDERICK GELSTHARP, a citizen of the United States, and a resident of Tarentum, in the county of Allegheny and State of Pennsylvania, have made a new and useful invention in Improvements in Ornamental Glass and Processes of Making It, of which the following is a specification.

The invention relates to a new form of ornamental glass designed particularly for use in doors, partitions and the like, where sheet glass of the rough surface, ornamental type is ordinarily employed, although the glass may be used in other relations to advantage, such as in table tops and in some cases for windows where a very strong glass with reduced light transmitting qualities is called for. The invention has for its primary objects; (1) the provision of an improved glass of the type above specified which has a distinctive and superior appearance, characterized by a luster of surface not found in other types of rough glass, and (2) the provision of a new and improved method of producing the glass and giving it the surface specified at a cost much below that of other ornamental glass used in similar relations. One form of apparatus for practicing the process and producing the improved form of glass is illustrated in the accompanying drawings wherein:

The figure is a vertical section through the tank and rolling machine used in connection therewith.

Referring to the drawing, 1 is a melting tank having the outlet end 2 and a gate 3 by means of which the flow of glass to the outlet end may be cut off. Leading laterally from the portion 2 of the tank is the outlet slot 4 which conducts the glass between a pair of water-cooled rollers 5 and 6. The sheet or ribbon 7 passes over the rolls 8 and into the end 9 of the roller leer. The rollers 5 and 6 are shown as carried upon a truck 10 and driven from the pinion 11, such pinion meshing with a spur gear 12 carried by the axle of the roll 6 and meshing with a similar spur gear 13 carried by the axle of the roll 5. Additional heat may be applied to the sheet 7 before it enters the leer, by means of the transverse burners 14 and 15. The showing of the apparatus as above described is more or less rough and diagrammatic as such apparatus is no part of the present invention and a number of different types of apparatus might be employed to carry out the process and produce the improved ornamental glass.

The rolls 5 and 6 are preferably of cast iron or steel and their surfaces are somewhat roughened in order to produce the desired ornamental effect upon the glass ribbon or sheet. The rolls may be roughened in turning them up or afterwards in any desired way, but are preferably turned relatively smooth and then used in the making of glass which is subsequently ground and polished until their surfaces become worn and assume a granular appearance. It is this granular or somewhat pebbled appearance which it is desired to secure upon the surfaces of the glass ribbon. This wearing condition has been referred to as "bringing out the grain of the metal," and while this may not be correctly descriptive of what happens in the wearing operation, it serves in connection with the description previously given in giving a conception as to the desired surface condition of the rolls. The minute depressions and projections which produce the granular appearance, are very slight, so that the surface produced on the glass feels relatively smooth, but the visual impression incident to this roughening upon the glass is very marked and very distinctive in character.

Aside from the character of the roughening of the glass sheet produced, the surface is distinctive because of its bright, lustrous appearance. This is due to the heating conditions under which the sheet is formed and maintained in passing through the rolls and into the leer as the lustrous surface is due to the maintenance of a relatively high temperature during this portion of the operation. The temperature of the surface must not reach such a point as to cause it to flow and thus destroy the minute irregularities produced upon the surface by the rolls, but at the same time, it must be sufficient to prevent the surface from assuming a dull lifeless appearance such as occurs where the skin of a glass sheet is cooled suddenly below the setting temperature. In a way the finish may be said to be a semi-fire finish since the lustrous appearance is imparted without causing any substantial flowing of the surface such as is characteristic of a complete fire finish. The temperature condition depends upon several factors. The temperature of the sheet 7 is increased by decreasing the water cooling of the rolls 4 and 5, or by increasing the temperature of the glass in the tank from the outlet of the tank, or by increasing the speed of rotation of the rolls so that the cooling effect of such rolls upon the sheet is decreased, or by increasing the amount of heat supplied from the burners 14 and 15. All of these factors contribute to the securing of a temperature in the glass such as will insure the lustrous finish heretofore referred to.

The glass as produced by the process has a more brilliant surface than ornamental glasses produced by etching plate glass with acid or by removing the surface by the use of glue or by any of the well known processes which involve the marring of the surface after it has once set or hardened. It is also more transparent than such glasses and may be used for glazing purposes in factories. In some instances one of the surfaces may be much smoother and less marked than the other surface and the general result secured is the same whether one or both surfaces are roughened, so that the invention is not limited to ornamenting both surfaces. In the normal production of the glass with an apparatus such as that shown in the drawing, the lower surface of the sheet or ribbon will be more strongly marked than the upper surface. Because the surface of the glass is relatively smooth, it is relatively easy to keep clean and the strength of the glass is not impaired as is the case in those types of ornamental glass in which the surface skin is destroyed or abraded after the glass has set. Other advantages incident to the product and the process of producing it, one of which is its cheapness, will be readily apparent to those skilled in the art.

What I claim is:

1. A process of making ornamental glass, which consists in continuously forming, from a body of molten glass, a ribbon or sheet having a chilled, slightly roughened surface, and during such formation, and while the sheet or ribbon is setting maintaining such a relatively high temperature for such time as to produce a bright lustrous finish without removing the surface irregularities which give it its rough appearance.

2. As a new article of manufacture, flat ornamental glass, having a slightly roughened surface, such as produced by contact of plastic glass with a metal chilling surface worn by service to bring out the grain of the metal, but of bright lustrous appearance.

In testimony whereof, I have hereunto subscribed my name this 10th day of March, 1924.

FREDERICK GELSTHARP.